United States Patent [19]

Grachev et al.

[11] 4,246,813
[45] Jan. 27, 1981

[54] STRAIGHT TURNING AUTOMATIC LATHE

[76] Inventors: Konstantin A. Grachev, Naberezhnaya Kosmonavtov, 3, Kv. 67; Jury N. Sulie, ulitsa Sovetskaya, 63, Kv. 9; David N. Tverskoi, ulitsa Pushkina, 17/25, Kv. 184, all of Saratov, U.S.S.R.

[21] Appl. No.: 48,801

[22] Filed: Jun. 15, 1979

[30] Foreign Application Priority Data

Aug. 8, 1978 [SU] U.S.S.R. .............................. 2640258

[51] Int. Cl.³ .................... B23B 13/00; B23B 21/00
[52] U.S. Cl. .......................................... 82/2.5; 82/25
[58] Field of Search ...................... 82/2 R, 2.5, 25

[56] References Cited

U.S. PATENT DOCUMENTS

| 291,455 | 1/1884 | Wood | 82/2 R |
|---|---|---|---|
| 2,473,306 | 6/1949 | Schreiber | 82/2.5 |
| 2,932,083 | 4/1960 | De Nicolo | 82/2 R |
| 3,926,078 | 12/1975 | Ishizuka et al. | 82/2.5 |
| 4,016,784 | 4/1977 | Brown | 82/2 R |
| 4,058,033 | 11/1977 | Lahm | 82/2 R |
| 4,065,988 | 1/1978 | Lohneis et al. | 82/2.5 |

*Primary Examiner*—Harrison L. Hinson
*Attorney, Agent, or Firm*—Steinberg & Raskin

[57] ABSTRACT

The straight turning automatic lathe whose bed carries a longitudinally movable spindle headstock with a bar workpiece and at least one secured upright carrying a cross slide with cutting tools. The upright is held motionless on the bed at a certain distance from the forward end face of the spindle head stock in its extreme advanced position and the cross slide is mounted on the upright side facing the forward end of the spindle headstock.

2 Claims, 5 Drawing Figures

STRAIGHT TURNING AUTOMATIC LATHE

The present invention relates to machine-tool industry and more particularly to straight turning automatic lathes.

It is expedient to use the straight turning automatic lathe made in accordance with the present invention for precise machining of parts preferably of stainless steel.

Widely known in the art is a straight turning automatic lathe of a Switzerland model comprising a bed whose guides mount a movable spindle headstock providing longitudinal feed of the bar in machining.

Attached to the bed is also an upright carrying an array of cross slides located around the axis of rotation of the spindle headstock. The cross slides can move radially to provide the required transverse feed of the cutting tools. The cross slides carrying the cutting tools are installed on the upright side facing away from the spindle headstock when the latter occupies its rearest position.

A rest is mounted on the upright in alignment with the spindle headstock to support the bar during operation.

Since the cross slides of the Switzerland-model straight turning automatic lathes are installed on the upright side facing away from the spindle headstock, the cutting force component $P_x$ tends to break off the active cross slides from their bearing surfaces, which affects the rigidity of the cross slides proper and impairs stiffness of the cross slide-mounted cutting tools that are also acted upon by the tearing-off cutting force component $P_x$ which tends to separate the tools from their seats on the cross slides.

Under these circumstances definite cutting force limitations must be observed to attain high accuracy of machining operation. Such lathes are used mostly for fabrication of parts from automatic steel and non-ferrous alloys. Stainless steel workpieces can be handled on the lathes, provided small depth of cut and reduced cutting speeds and feeds per work turn are maintained.

It is an object of the present invention to provide a modified straight turning automatic lathe with such an arrangement of the cross slide relative to the spindle headstock and upright that a stiff system of work cutting components of the lathe be formed to more efficiently machine workpieces from stainless steel of various grades and attain high degree of accuracy and surface finish at comparatively greater depths of cut.

Another object of the present invention is to increase the rate of production of the automatic lathe.

Said and other objects of the invention are accomplished in a straight turning automatic lathe comprising a bed-mounted axially movable work spindle headstock and at least one stationary upright carrying a cross slide with cutting tools, wherein, according to the invention, the upright is secured on the bed at a certain distance from the forward end face of the spindle headstock in the extreme advanced position of the latter and the cross slide is mounted on the upright side facing the forward end of the spindle headstock.

It is expedient to install a turret on the cross slide and clamp cutting tools on the turret side also facing the forward end of the spindle headstock.

The use of a turret with the above stated clamping of the cutting tools on the straight turning automatic lathe makes it possible to set all the cutting tools with an equal overhang, i.e. equal length of tool extension from the tool active point to the tool clamping place, which can be materially reduced as compared to the tool extension in the known straight turning automatic lathes, and which, in turn, adds to the stiffness of the tool support.

The straight turning automatic lathe made in accordance with the present invention makes it possible to machine workpieces of various stainless steels at a depth of cut up to 6 mm, ensuring an accuracy superior to that attainable on the known models of the straight turning automatic lathes.

A specific embodiment of the present invention will now be described by way of example with reference to the accompanying drawings, in which: FIG. 1 shows a straight turning automatic lathe according to the invention, longitudinal section;

Figure 1:
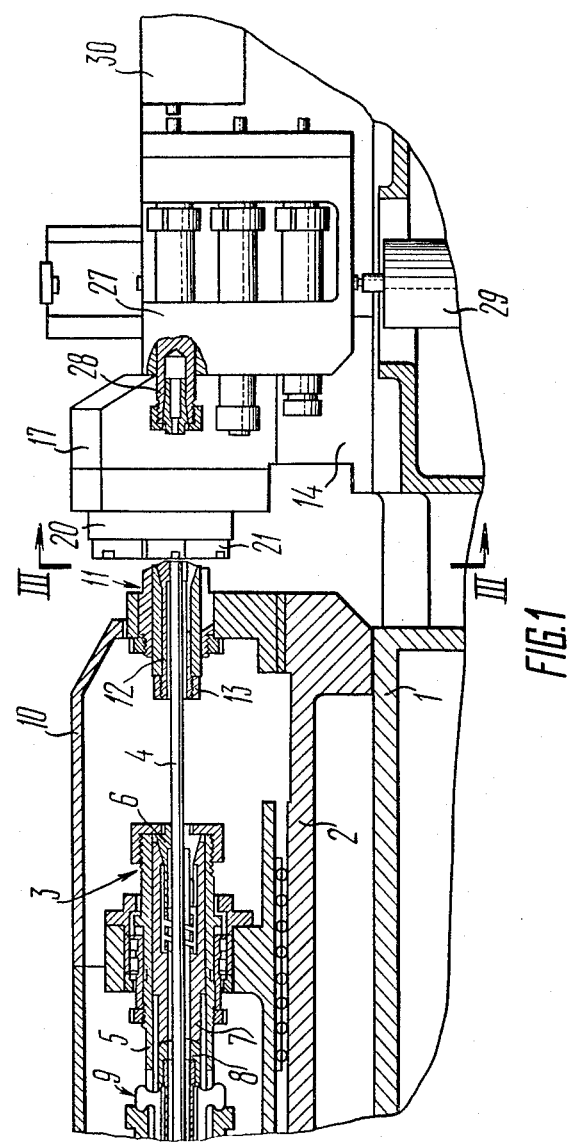

The straight turning automatic lathe comprises a bed 1 (FIGS. 1 and 2) whose guides 2 carry a spindle headstock 3 of the bar workpiece 4.

The spindle headstock 3 can slide along the guides 2 to ensure longitudinal feed of the bar workpiece 4. It comprises a spindle 5 (FIG. 1) geared with its drive (not shown) providing basic motion (rotation of the bar workpiece 4), a collet chuck 6 to grip the bar workpiece 4 in the spindle 5 through the agency of a hold-down sleeve 7 linked up with a fixing mechanism 9 via a spherical bush 8. The spindle headstock 3 is enclosed with a casing 10.

A rest 11 comprising a rest collet chuck 12 is mounted on the guides 2 to support the bar 4 in the process of machining. A nut 13 is used for adjustment of the clearance between the workpiece 4 and the rest collet chuck 12.

Figure 3:
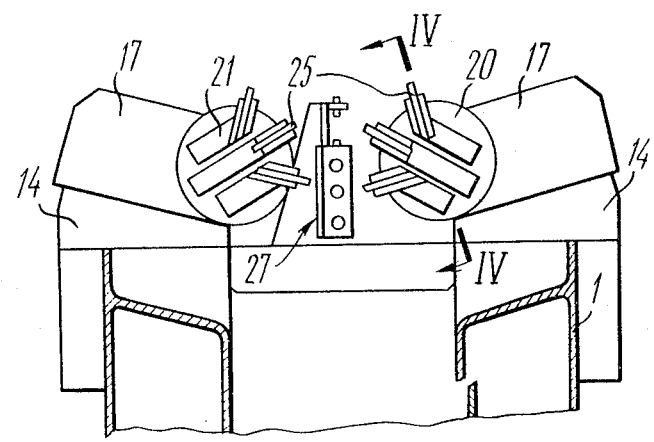
FIG. 3 is a section on the line III—III of FIG. 1.
Figure 4:
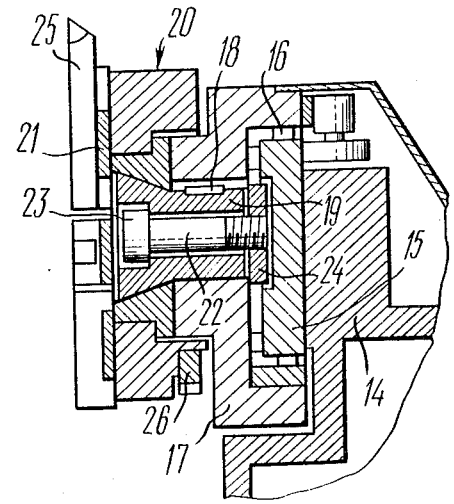
FIG. 4 is a section on the line IV—IV of FIG. 3.

Two uprights 14 (FIGS. 3 and 4) are installed on the bed 1 at a certain distance from the rest 11.

Figure 2:
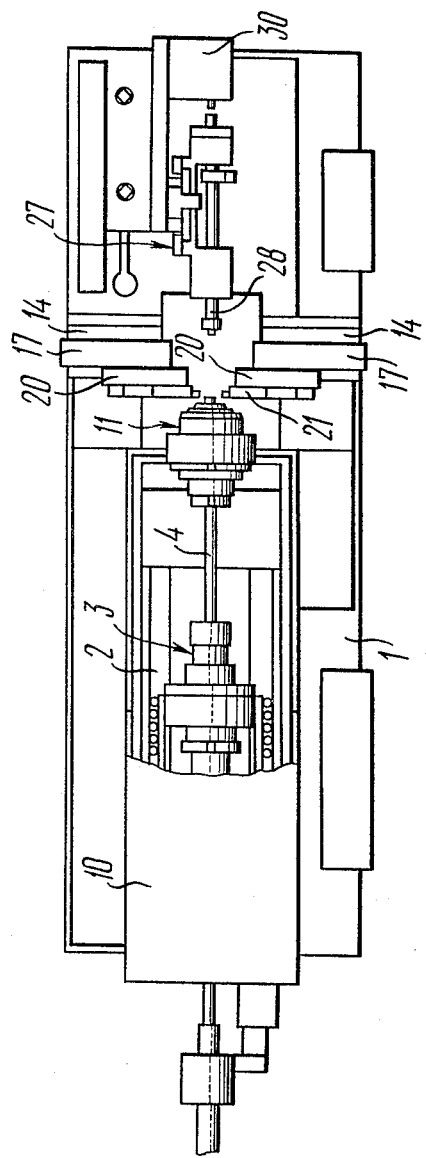
FIG. 2 is a top view of the straight turning automatic lathe.

Guide blocks 15 (FIG. 4) are attached to each upright 14 at the side facing the rest 11 (FIG. 1). A cross slide 17 is mounted in the guides on rollers 16. Each cross slide 17 carries an axle 19 secured by a key 18 and provided with a tapered portion. Mounted on the tapered portion of the axle 19 is a turret 20 with toolholders 21.

To adjust the gap between the cross slide 17 and turret 20, use is made of stud 22 and nut 23. The stud 22 is driven into a flange 24 secured within the cross slide 17.

The toolholders 21 are fastened to the end face of the turret 20, facing the spindle headstock 3 (FIG. 1). The distance between the cross rest upright 14 and forward end face of the rest 11 is chosen to be sufficient for installation of the turret 20. Cutting tools 25 (FIGS. 3 and 4) are clamped in the toolholders 21.

The tips of the cutting tools 25 lie in one plane passing at a minimum permissible distance from the end face of the rest collet chuck 12 (FIG. 1). Such an arrangement of the turret 20 provides high stiffness of the system formed by the rest collet chuck 12, bar 4, cutting tool 25, turret 20, cross slide 17, upright 14 and bed 1.

In the invention embodiment under consideration three toolholders 21 are fastened onto the turret 20. To set the desired toolholder 21 at its working position, use is made of a rotary toothed sector 26 geared with its drive (not shown). Should a turret be furnished with a greater number of toolholders (for instance, six), it must be rotated through 360°, in which case a gear ring is to be installed instead of the toothed sector.

Mounted on the bed 1 co-axially with the rest 11 (FIG. 1 and 2) is a sliding carriage 27 carrying tailstock spindles 28 for clamping end tools: drills, taps, etc. (not shown).

To set the desired tailstock spindle 28 in its working position (co-axial with the spindle headstock), use is made of a hydraulic cylinder 29 (FIG. 1) and to extend the tailstock spindle to its working position (move it towards the rest 11), hydraulic cylinder 30 is actuated.

The straight turning automatic lathe operates as follows.

The straight turning automatic lathe is teamed by a numerical control system comprising information for controlling movement of the spindle headstock 3 and cross slides 17, for setting the cutting tools 25 and end tools (not shown) clamped in the tailstock spindles 28 of the sliding carriage 27 to their working positions, for changing the frequency and direction of rotation of the bar 4, for actuating the collet chuck, etc.

In the initial state the spindle headstock 3 and cross slides 17 are in their initial "zero" positions.

The spindle headstock 3 moves along the guides 2 on the bed 1 together with the revolving bar 4 gripped in the collet chuck 6. The bar 4 is supported in proximity to the machining zone by the rest collet chuck 12 in the immediate vicinity of the plane passing through the active points of the cutting tools 25.

The cross slides carrying the cutting tools 25 can move in the transverse direction relative to the axis of the spindle headstock 3, thus performing the required OD operation on the bar 4. Therefore, in combination of the movement of the spindle headstock 3 with the appropriate travel of the cross slides 17 one can accomplish turning of cylindrical and shaped surfaces, trimming, chamfering, various grooving, cutting-off and threading operations with the use of cutting tools. Drilling of centers, hole drilling (deep drilling included), reaming, thread-cutting by means of taps and dies are affected by using tools clamped in the tailstock spindles 28 of the sliding carriage 27. The respective tailstock spindle 28 is brought in axial alignment with the spindle headstock 3 by the hydraulic cylinder 29 and then advanced to the end face of the bar 4 by the hydraulic cylinder 30. Axial feed is accomplished by the spindle headstock 3. If need arises, the tool clamped in a tailstock spindle 28 can be advanced into and retracted from the hole alternately as many times as necessary, which is particularly important in drilling deep holes.

Figure 5:
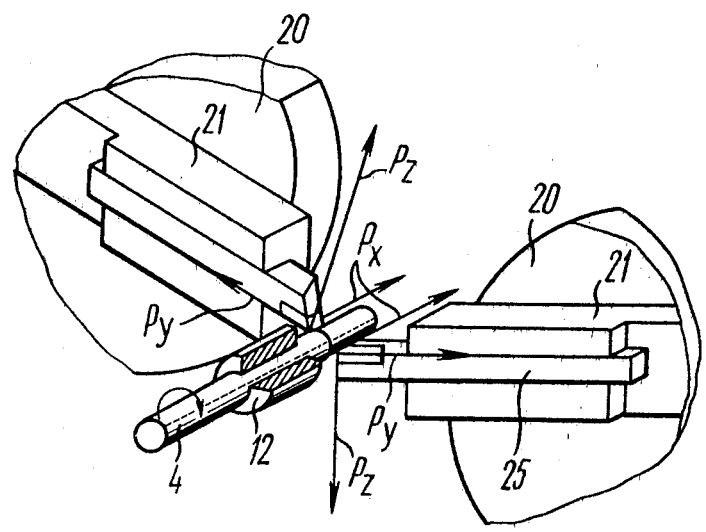
FIG. 5 shows a diagram of cutting force components acting on cross slides.

Cutting forces arising in machining of the bar 4 exert pressure on the cutting tools 25, toolholders 21, turret 20 and cross slides 17. The cutting force component $P_x$ (FIG. 5) directed parallel to the axis of the spindle headstock 3 towards the end face of the turret 20 and square to the end face acts so that the cutting tools 25 gripped in the toolholders 21 are pressed to the end face of the turret 20, while the cross slide 17 adds an identically directed force pressing the turret 20 to the guide block 15 attached to the upright 14.

The cutting force component $P_z$ is directed so that the cross slide 17 is held tight against the side surface of the guide block 15, which is square to the guide block surface facing the end face of the rest 11.

The cutting force component $P_y$ acting in the radial direction exerts an effort on the cross slide 17 pressing it to the upright 14 through the medium of feeding edges (not shown) of the feeding mechanism arranged between the upright 14 and cross slide 17.

In conjunction with the minimum possible extension of cutting tools 25 from their points of clamping in the toolholders 21 as well as due to the fact that the latter are installed on the turret 20 and that maximum two cutting tools opposite to each other are found active in the working zone, the above described action of the cutting force components on the cutting tools 25 and cross slides 17 results in a stiff system formed by the rest 11, bar 4, cutting tool 25, thus providing high accuracy of machining and greater production rate due to an increase in the cutting speed and feed, making it possible to machine a wider variety of workpieces thanks to a higher accuracy of machining and broader range of workpiece diameters.

The above described invention has been carried into practice on a straight turning numerically controlled automatic lathe capable of machining bars up to 16 mm in diameter.

The construction of such an automatic lathe was dictated by a need for a lathe capable of machining a greater number of precision items from a wider variety of materials, including various grades of stainless steel, under greater depth of cut, for an increase in the rate of productivity in small-lot and large-lot production so that universal and straight turning cam-controlled lathes will be superseded by the automatic lathes of this novel design.

The classic Switzerland makeup of straight turning automatic lathes does not meet the above mentioned requirements because of insufficient stiffness of the upright and cross slides together with the toolholders arranged on the upright side reverse to that facing the spindle headstock.

The results of the type approval tests of the proposed automatic lathes have revealed that the work diameter discrepancy falls within 0.005 mm for any diameter jobs up to 16 mm even for depth of cut as great as 4–6 mm in machining stainless steel workpieces with the contents of chrome within 13 and 20%, nickel up to 11% and titanium up to 5%. The surface finish quality is not worse than Ra 1.25 for steel items and not worse than Ra 0.63 for non-ferrous items.

The stiffness and accuracy characteristics of the proposed automatic lathe are high enough to do well without an intermediate work-size model automatic lathe in machining bar workpieces up to 16 mm in diameter.

What we claim is:

1. A straight turning automatic lathe comprising: a bed; a workpiece-carrying spindle headstock slidably mounted on said bed so that it can move along the bed to provide longitudinal feed; a spindle of said spindle headstock; a means for rotation of said spindle and for longitudinal movement of said spindle headstock; at least one upright secured on said bed at a certain distance from the forward end face of said spindle headstock in its extreme advanced position; a cross slide mounted on said upright at the side facing the forward end of said spindle headstock; cutting tools clamped in said cross slide at the side facing the forward end of said spindle headstock; said cross slide being attached on said upright so that it can move radially relative to the upright to provide required transverse feed; a means for displacement of said cross slide.

2. A straight turning automatic lathe according to claim 1, wherein a turret is installed on the cross slde and the cutting tools are clamped on the turret end surface facing the forward end of the spindle headstock.

* * * * *